(12) United States Patent
Akai et al.

(10) Patent No.: US 11,305,657 B2
(45) Date of Patent: Apr. 19, 2022

(54) ELECTRIC PROPULSION VEHICLE CHARGING CABLE AND POWER ADAPTER ATTACHED TO ELECTRIC PROPULSION VEHICLE CHARGING CABLE

(71) Applicants: Panasonic Corporation, Osaka (JP); NISSAN MOTOR CO., LTD., Kanagawa (JP)

(72) Inventors: Naruaki Akai, Nara (JP); Kouichi Motooka, Kanagawa (JP)

(73) Assignees: PANASONIC CORPORATION, Osaka (JP); NISSAN MOTOR CO., LTD., Kanagawa (JP)

( * ) Notice: Subject to any disclaimer, the term of this patent is extended or adjusted under 35 U.S.C. 154(b) by 72 days.

(21) Appl. No.: 16/886,110

(22) Filed: May 28, 2020

(65) Prior Publication Data

US 2020/0317069 A1  Oct. 8, 2020

Related U.S. Application Data

(63) Continuation of application No. PCT/JP2018/043473, filed on Nov. 27, 2018.

(30) Foreign Application Priority Data

Nov. 30, 2017  (JP) .............................. JP2017-231009

(51) Int. Cl.
*B60L 53/16* (2019.01)
*B60L 53/18* (2019.01)
*H01R 31/06* (2006.01)

(52) U.S. Cl.
CPC .............. *B60L 53/16* (2019.02); *B60L 53/18* (2019.02); *H01R 31/06* (2013.01); *H01R 2201/26* (2013.01)

(58) Field of Classification Search
CPC ................................ B60L 53/16; H01R 31/06
(Continued)

(56) References Cited

U.S. PATENT DOCUMENTS 9,211,801 B2  12/2015  Akai et al.
9,472,899 B1  10/2016  Reedy et al.
(Continued)

FOREIGN PATENT DOCUMENTS

JP  2012-135104  7/2012
JP  2014-517664  7/2014
(Continued)

OTHER PUBLICATIONS

Official Communication issued in International Patent Application No. PCT/JP2018/043473, dated Jan. 29, 2019, along with an English translation thereof.

*Primary Examiner* — Suchin Parihar
(74) *Attorney, Agent, or Firm* — Greenblum & Bernstein, P.L.C.

(57) ABSTRACT

To provide the electric propulsion vehicle charging cable compatible with power sources of different standards, and the power adapter attached to an electric propulsion vehicle charging cable, the power plug of the electric propulsion vehicle charging cable includes has an electrode structure including three high-voltage electrodes and a high-voltage ground pin, the electric propulsion vehicle charging cable used for charging a battery of the electric propulsion vehicle by using two of the three high-voltage electrodes, and the power adapter has electrode receptacles to which the three high-voltage electrodes and the high-voltage ground pin are connected and connection terminals having an electrode structure corresponding to a power source of a different standard from the electrode structure of the power plug.

20 Claims, 10 Drawing Sheets

(58) Field of Classification Search
USPC .......................................................... 320/109
See application file for complete search history.

(56) References Cited

U.S. PATENT DOCUMENTS

| | | | |
|---|---|---|---|
| 9,882,313 | B2 | 1/2018 | Steinbuchel, IV et al. |
| 10,124,753 | B2 | 11/2018 | Bouchez et al. |
| 2013/0076122 | A1* | 3/2013 | Ohtomo .................... H02J 7/04 307/9.1 |
| 2013/0314034 | A1* | 11/2013 | Ang ........................ B60L 53/16 320/107 |
| 2013/0335024 | A1 | 12/2013 | Akai et al. |
| 2014/0042807 | A1 | 2/2014 | Bouchez et al. |
| 2016/0190744 | A1* | 6/2016 | Steinbuchel, IV ..... H01R 13/64 439/34 |
| 2018/0015834 | A1* | 1/2018 | Karlson .................. B60L 53/16 |
| 2018/0175554 | A1 | 6/2018 | Steinbuchel, IV et al. |
| 2020/0282849 | A1* | 9/2020 | Niederl ................... B60L 53/14 |

FOREIGN PATENT DOCUMENTS

| | | |
|---|---|---|
| JP | 2016-517141 | 6/2016 |
| WO | 2012/117743 | 9/2012 |

\* cited by examiner

ELECTRIC PROPULSION VEHICLE CHARGING CABLE AND POWER ADAPTER ATTACHED TO ELECTRIC PROPULSION VEHICLE CHARGING CABLE

CROSS-REFERENCE TO RELATED APPLICATIONS

The present application is a Bypass Continuation of International Application No. PCT/JP2018/043473 filed Nov. 27, 2018, claiming priority to Japanese Patent Application No. 2017-231009, filed Nov. 30, 2017, the contents of each application are hereby incorporated by reference in their entirety.

TECHNICAL FIELD

The present disclosure relates to an electric propulsion vehicle charging cable used for charging a battery of an electric propulsion vehicle such as an electric vehicle or a hybrid vehicle, for example, and a power adapter attached to an electric propulsion vehicle charging cable.

BACKGROUND ART

Electric propulsion vehicles are recently continuously developed as environmentally-friendly automobiles at a fast pace. Charging infrastructures for electric propulsion vehicles include residential charging facilities using a residential power source at an end of a power network, and public charging facilities disposed in an urban area and basically available to unspecified number of people. Regarding the electric propulsion vehicles, important issues for popularization of the electric propulsion vehicles is to make a charging operation easy and to reduce a charging time.

When a user utilizes a charging facility to charge a battery of an electric propulsion vehicle, an electric propulsion vehicle charging cable (hereinafter abbreviated as a charging cable) is used for connecting a power source in the charging facility and a connector on the electric propulsion vehicle side. A configuration using such a charging cable has been proposed for achieving a reduction in charging time (see, e.g., Patent Literature 1).

CITATION LIST

Patent Literatures

Patent Literature 1: WO 2012/117743

SUMMARY OF INVENTION

Technical Problem

The charging facilities use various power sources having different power-supply voltages and power plugs (electrode structures) such as a residential power source of 100 V/200 V single-phase AC and an industrial power source having of 200 V three-phase AC. However, it is difficult to prepare multiple charging cables corresponding to the various power sources of the charging facilities in an electric propulsion vehicle due to a limited space for storing the charging cable. For achieving a reduction in the charging time (rapid charging), it is desirable to use a power plug with large rated values, for example, a power plug with a rated voltage of 250 V and a rated current of 50 A, as a charging cable. However, since a 100 V residential power source may be used for charging a battery of an electric propulsion vehicle, the vehicle must include, for example, a charging cable provided with a power plug having a rated voltage of 125 V and a rated current of 15 A, in addition to a charging cable provided with a power plug having a rated voltage of 250 V and a rated current of 50 A.

Furthermore, in other countries, for example, in the United States, 115 V/230 V single-phase AC and 230 V three-phase AC power sources are used, and respective corresponding power plugs are different. On continents such as Europe, where multiple countries with different power-supply voltages are connected by land, the electric propulsion vehicle moves across regions and borders with different power-supply voltages, and therefore, the vehicle must be equipped in advance with charging cables corresponding to various power source situations in the regions or countries.

However, as described above, the electric propulsion vehicle cannot be equipped with many charging cables due to a limited space for storing the charging cables, which is a major obstacle for popularizing the electric propulsion vehicles.

The present disclosure was conceived in view of the problems as described above and an object thereof is to provide an electric propulsion vehicle charging cable compatible with power sources of different standards, and a power adapter attached to an electric propulsion vehicle charging cable.

Solution to Problem

To achieve the object, the present disclosure provides
an electric propulsion vehicle charging cable having one end provided with a power plug connected to a power source of a charging facility and the other end provided with a charging coupler detachably connected via a control unit to an electric propulsion vehicle, wherein the power plug has an electrode structure including three high-voltage electrodes and a high-voltage ground pin, the electric propulsion vehicle charging cable used for charging a battery of the electric propulsion vehicle by using two of the three high-voltage electrodes, and wherein the electric propulsion vehicle charging cable has a power adapter including electrode receptacles to which the three high-voltage electrodes and the high-voltage ground pin are connected and connection terminals having an electrode structure corresponding to a power source of a different standard from the electrode structure of the power plug.

The present disclosure also provides
a power adapter attached to an electric propulsion vehicle charging cable having one end provided with a power plug connected to a power source of a charging facility and the other end provided with a charging coupler detachably connected via a control unit to an electric propulsion vehicle, wherein the power plug has an electrode structure including three high-voltage electrodes and a high-voltage ground pin, the electric propulsion vehicle charging cable used for charging a battery of the electric propulsion vehicle by using two of the three high-voltage electrodes, and wherein the power adapter includes electrode receptacles to which the three high-voltage electrodes and the high-voltage ground pin are connected and connection terminals having an electrode structure corresponding to a power source of a different standard from the electrode structure of the power plug.

Advantageous Effects of Invention

The present disclosure enables provision of the electric propulsion vehicle charging cable compatible with power sources of different standards, and the power adapter attached to an electric propulsion vehicle charging cable.

DESCRIPTION OF EMBODIMENTS

Figure 1:
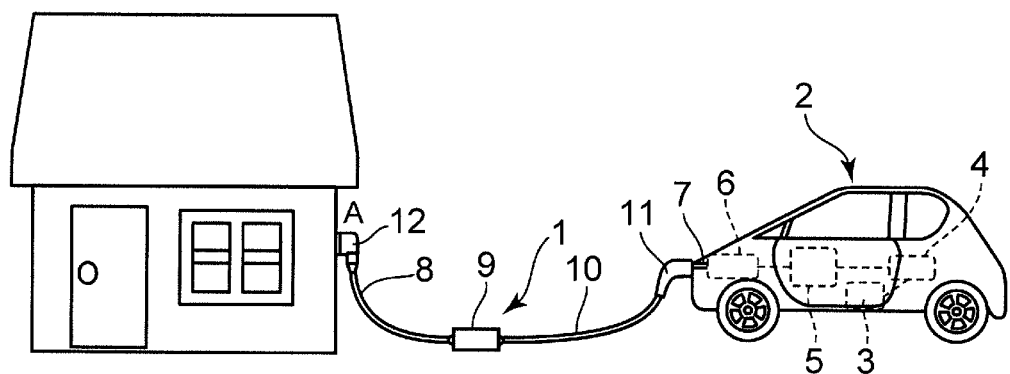
FIG. 1 is a diagram schematically showing a state of a charging cable of a first embodiment according to the present disclosure used for charging a battery of an electric propulsion vehicle from a charging facility.

In each of aspects of the present disclosure described below, main elements are denoted by reference numerals described in a first embodiment described below, and these reference numerals are merely intended to facilitate understanding, rather than limiting the present disclosure to the configuration described in the embodiments.

An electric propulsion vehicle charging cable (1) according to a first aspect of the present disclosure has one end provided with a power plug (12) connected to a power source of a charging facility and the other end provided with a charging coupler (11) detachably connected via a control unit (9) to an electric propulsion vehicle, wherein the power plug has an electrode structure including three high-voltage electrodes (14a, 14b, 14c) and a high-voltage ground pin (15), the electric propulsion vehicle charging cable used for charging a battery of the electric propulsion vehicle by using two (14a, 14b) of the three high-voltage electrodes, and wherein the electric propulsion vehicle charging cable has a power adapter (13) including electrode receptacles (20, 21, 22, 23) to which the three high-voltage electrodes and the high-voltage ground pin are connected and connection terminals (18a, 18b, 19) having an electrode structure corresponding to a power source of a different standard from the electrode structure of the power plug.

In the electric propulsion vehicle charging cable according to a second aspect of the present disclosure, the connection terminals of the power adapter in the first aspect have an electrode structure including two low-voltage electrodes (18a, 18b) and a low-voltage ground pin (19) of a different standard from the electrode structure of the power plug, wherein in the power adapter, the electrode receptacle (22 or 23) to be connected to one high-voltage electrode (14c) not used as a charging electrode among the three high-voltage electrodes of the power plug and the electrode receptacle (23 or 22) to be connected to the high-voltage ground pin (15) may be electrically connected to each other, and wherein the two low-voltage electrodes (18a, 18b) may be respectively electrically connected to two electrode receptacles (20, 21) respectively connected to the two high-voltage electrodes (14a, 14b) used as charging electrodes among the three high-voltage electrodes of the power plug.

The electric propulsion vehicle charging cable according to a third aspect of the present disclosure, in the electric propulsion vehicle charging cable of the second aspect, wherein the power adapter includes four electrode holes (13a, 13b) into which the three high-voltage electrodes and the high-voltage ground pin of the power plug may be inserted and led to respective electrode receptacles (20, 21, 22, 23), wherein the four electrode holes may be symmetrically arranged on a contact surface (13e) for the power plug, and wherein among the four electrode holes, the electrode hole (13b) leading to the electrode receptacle (22 or 23) to be connected to the one high-voltage electrode (14c) not used as the charging electrode may have substantially the same shape as the electrode hole (13b) leading to the electrode receptacle (23 or 22) to be connected to the high-voltage ground pin (15).

In the electric propulsion vehicle charging cable according to a fourth aspect of the present disclosure, the power adapter of the third aspect may be configured to be attached to the power plug at positions rotated by 180 degrees from each other with respect to a center of arrangement of the four electrode holes on the contact surface for the power plug.

In the electric propulsion vehicle charging cable according to a fifth aspect of the present disclosure, in the power adapter of the fourth aspect, the electrode hole (13b) leading to the electrode receptacle (22 or 23) to be connected to the one high-voltage electrode (14c) not used as the charging electrode and the electrode hole (13b) leading to the electrode receptacle (23 or 22) to be connected to the high-voltage ground pin (15) may be arranged on an arrangement center line (P) included on the contact surface, and wherein the two electrode holes (13a) leading to the electrode receptacles (20, 21) respectively connected to the two high-voltage electrodes (14a, 14b) used as the charging electrodes may be symmetrically arranged on both sides of the arrangement center line.

In the electric propulsion vehicle charging cable according to a sixth aspect of the present disclosure, in any of the first aspect to fifth aspect, the power adapter may include locking means (17) engaging with the attached power plug.

In a power adapter attached to an electric propulsion vehicle charging cable (1) according to a seventh aspect of the present disclosure having one end provided with a power plug (12) connected to a power source of a charging facility and the other end provided with a charging coupler (11) detachably connected via a control unit (9) to an electric propulsion vehicle, the power plug may have electrode structure including three high-voltage electrodes (14a, 14b, 14c) and a high-voltage ground pin (15), the electric propulsion vehicle charging cable used for charging a battery of the electric propulsion vehicle by using two (14a, 14b) of the three high-voltage electrodes, wherein the power adapter may include electrode receptacles (20, 21, 22, 23) to which the three high-voltage electrodes and the high-voltage ground pin may be connected and connection terminals (18a, 18b, 19) having an electrode structure corresponding to a power source of a different standard from the electrode structure of the power plug.

In a power adapter attached to an electric propulsion vehicle charging cable according to an eighth aspect of the present disclosure, in the seventh aspect, the connection terminals of the power adapter may have an electrode structure including two low-voltage electrodes (18a, 18b) and a low-voltage ground pin (19) of a different standard from the electrode structure of the power plug, wherein the electrode receptacle (22 or 23) to be connected to one high-voltage electrode (14c) not used as a charging electrode among the three high-voltage electrodes of the power plug and the electrode receptacle (23 or 22) to be connected to the high-voltage ground pin (15) may be electrically connected to each other, and wherein the two low-voltage electrodes (18a, 18b) may be respectively electrically connected to two electrode receptacles (20, 21) respectively connected to the two high-voltage electrodes (14a. 14b) used as charging electrodes among the three high-voltage electrodes of the power plug.

In a power adapter attached to an electric propulsion vehicle charging cable according to a ninth aspect of the present disclosure, in the eighth aspect, the power adapter may include four electrode holes (13a, 13b) into which the three high-voltage electrodes and the high-voltage ground pin of the power plug may be inserted and led to respective electrode receptacles (20, 21, 22, 23), wherein the four electrode holes may be symmetrically arranged on a contact surface (13e) for the power plug, and wherein among the four electrode holes, the electrode hole (13b) leading to the electrode receptacle (22 or 23) to be connected to the one high-voltage electrode (14c) not used as the charging electrode may have substantially the same shape as the electrode hole (13b) leading to the electrode receptacle t (23 or 22) o be connected to the high-voltage ground pin (15).

In a power adapter attached to an electric propulsion vehicle charging cable according to a tenth aspect of the present disclosure, the power adapter of the ninth aspect may be configured to be attached to the power plug at positions rotated by 180 degrees from each other with respect to a center of arrangement of the four electrode holes on the contact surface for the power plug.

In a power adapter attached to an electric propulsion vehicle charging cable according to an eleventh aspect of the present disclosure, in the tenth aspect, the electrode hole (13b) leading to the electrode receptacle (22 or 23) to be connected to the one high-voltage electrode (14c) not used as the charging electrode and the electrode hole (13b) leading to the electrode receptacle (23 or 22) to be connected to the high-voltage ground pin (15) may be arranged on an arrangement center line (P) included on the contact surface, and wherein the two electrode holes (13a) leading to the electrode receptacles (20, 21) respectively connected to the two high-voltage electrodes (14a, 14b) used as the charging electrodes may be symmetrically arranged on both sides of the arrangement center line.

In a power adapter attached to an electric propulsion vehicle charging cable according to a twelfth aspect of the present disclosure, in any of the seventh aspect to eleventh aspect, the power adapter may include locking means (17) engaging with the attached power plug.

Embodiments according to the present disclosure will now be described with reference to the accompanying drawings. In the drawings, the same elements are denoted by the same reference numerals and may not be described. The drawings schematically show respective constituent elements for ease of understanding.

The embodiments described below show a specific example of the present disclosure. Numerical values, shapes, configurations, etc. described in the following embodiments are merely examples and do not limit the present disclosure. Among the constituent elements in the following embodiments, constituent elements not described in the independent claim describing the highest concept are described as optional constituent elements. the same applies to configurations of modifications in the embodiments, and the configurations described in the modifications may be combined with each other.

First Embodiment

FIG. 1 schematically shows a state of an electric propulsion vehicle charging cable 1 of the first embodiment according to the present disclosure (hereinafter, simply referred to as a "charging cable 1") used for charging a battery 5 of an electric propulsion vehicle 2 from a residential power source (100 V/200 V) used in general homes as a charging facility.

The charging cable 1 has a configuration enabling charging of the electric propulsion vehicle 2 from a general residential power source (100 V/200 V) disposed on a residential exterior wall of a general home as well as from a power source facility (three-phase 200 V) of a different standard.

As shown in FIG. 1, the battery 5 of the electric propulsion vehicle 2 is charged by connecting the electric propulsion vehicle 2 via the charging cable 1 to a high-voltage residential power source A (200 V). The electric propulsion vehicle 2 has configuration in which the battery 5 of the electric propulsion vehicle 2 can be charged also from a low-voltage residential power source B (100 V) of a standard different from the high-voltage residential power source A (200 V) by using the charging cable 1 to which a power adapter 13 described later is attached.

While rapid charging can obviously be performed with a high voltage and a large current, the charging cable 1 is configured such that charging can appropriately be performed according to the standards of the respective residential power supplies A, B.

The electric propulsion vehicle 2 includes a motor 3 for running, an inverter 4, a battery 5, and a charging control device 6, which are electrically connected to each other. The electric propulsion vehicle 2 is connected to the charging cable 1 via a connector 7 connected to the charging control device 6. The charging cable 1 is connected to the high-voltage 200 V residential power source A, for example, and is used for charging the battery 5 mounted on the electric propulsion vehicle 2. The charging cable 1 has a configuration compatible with a power source of a different standard such as the low-voltage residential power source B (100 V) commonly used in general homes so that the battery 5 mounted on the electric propulsion vehicle 2 can optimally be charged according to the standard of the power source.

Figure 2:
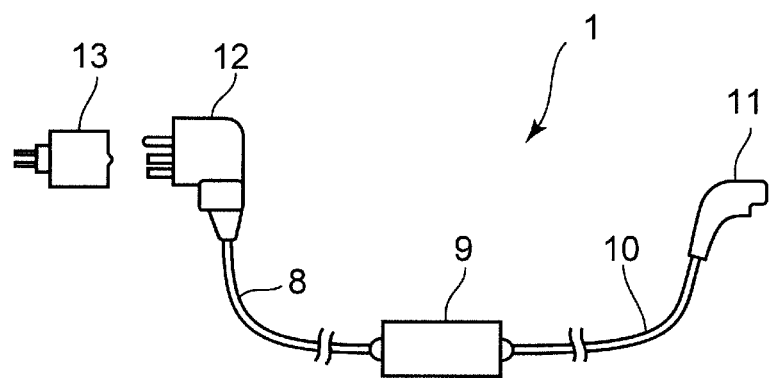
FIG. 2 is a diagram showing the charging cable of the first embodiment for connecting the electric propulsion vehicle and the charging facility.

FIG. 2 is an overall view showing the charging cable 1 according to the first embodiment. As shown in FIG. 2, the charging cable 1 includes a control unit 9 and is provided with a power-source-side cable 8 led out from the control unit 9 toward the power source and a vehicle-side cable 10 led out toward the electric propulsion vehicle. A charging coupler 11 detachably connected to the connector 7 of the electric propulsion vehicle 2 is disposed at a leading end portion of the vehicle-side cable 10. On the other hand, a power plug 12 to be attached to a charging facility such as a residential power source (A, B) is disposed at a leading end portion of the power-source-side cable 8.

The power plug 12 has electrode plates 14 (14*a*, 14*b*, 14*c*) and one ground pin (15) as a connection terminal so as to be connected to the 200 V residential power source A (See FIG. 4 described later). The power plug 12 is configured such that the power adapter 13 (see FIG. 7 described later) having two electrode plates (18*a*, 18*b*) and one ground pin (19) may be attached to the power plug 12, so that the charging cable 1 in the first embodiment is used also with the low-voltage residential power source B (100 V) commonly used in general homes. The charging cable 1 includes the power adapter 13 in the description of the present disclosure; however, the power adapter 13 is independently distributed in the market as a power adapter of the electric propulsion vehicle charging cable 1.

In the power plug 12, a temperature sensor (e.g., a resistance temperature detector) is embedded as temperature detecting means near the electrode plates (14*a*, 14*b*). Temperature information of the power plug 12 detected by the temperature sensor (16: see FIG. 5) is transmitted via the power-source-side cable 8 to the control unit 9. The control unit 9 has a configuration capable of monitoring the temperature of the power plug 12.

The power plug 12 and the power adapter 13 of the charging cable 1 according to the first embodiment will hereinafter be described.

[Power Plug 12]

Figure 3:
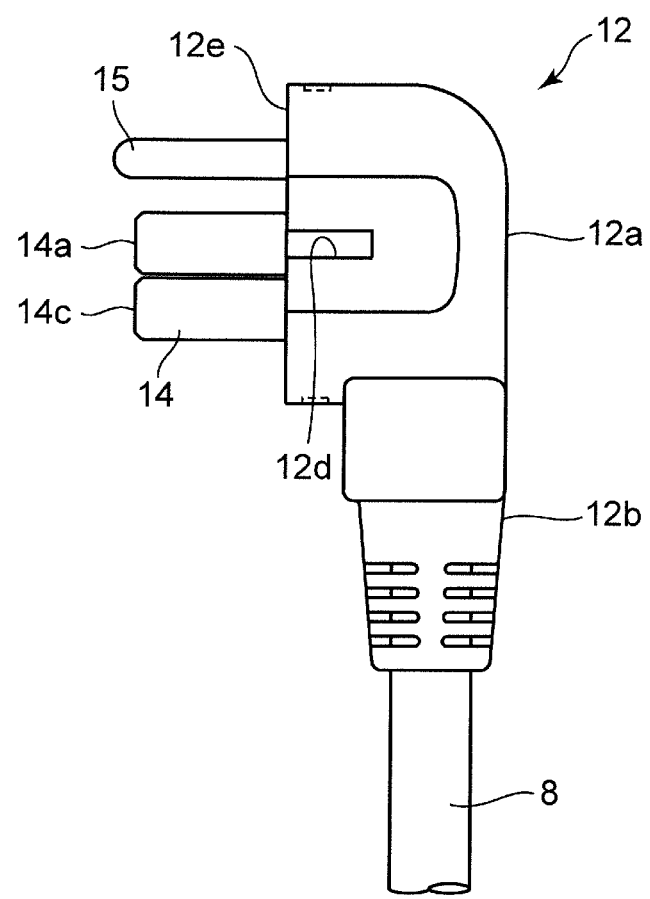
FIG. 3 is a side view showing a power plug of a power-source-side cable in the first embodiment.

FIG. 3 is a side view showing the power plug 12 disposed at an end portion of the power-source-side cable 8 in the first embodiment. In FIG. 3, the three electrode plates 14 and the ground pin 15 are projected on the left side of the power plug 12. FIG. 4 is a front view of the power plug 12, showing the connection terminal side on which the three electrode plates 14 (14*a*, 14*b*, 14*c*) and the ground pin 15 are projected. FIG. 5 is a vertical cross-sectional view of a substantially central portion of the power plug 12 shown in FIG. 3.

As shown in FIG. 3, the power plug 12 of the charging cable 1 of the first embodiment has an electrode structure having the three high-voltage electrodes (14: 14*a*, 14*b*, 14*c*) and the ground pin 15. The two high-voltage electrodes (14*a*, 14*b*) of the three high-voltage electrodes are used as charging electrodes. The power plug 12 includes a main body part 12*a* provided with the three electrode plates 14 (14*a*, 14*b*, 14*c*) serving as high-voltage electrodes and the ground pin 15, and a lead-out part 12*b* for leading out the power-source-side cable 8 from the main body part 12*a*. On the main body part 12*a* of the power plug 12, the electrode plates 14 and the ground pin 15 are disposed to project in a direction orthogonal to a contact surface 12*e* coming into contact with a power outlet serving as a power plug receptacle. The lead-out part 12*b* guides the power-source-side cable 8 from the main body part 12*a* such that the cable is led out parallel to the contact surface 12*e*, i.e., vertically downward. Therefore, as shown in FIG. 3, the power plug 12 has the electrode plates 14 and the ground pin 15 projected from the contact surface 12*e* in a horizontal direction. The power-source-side cable 8 is formed such that the cable is led out vertically downward. Thus, the power plug 12 has a configuration in which the projection direction of the electrode plates 14 and the ground pin 15 is substantially orthogonal to the lead-out direction of the power-source-side cable 8.

Figure 4:
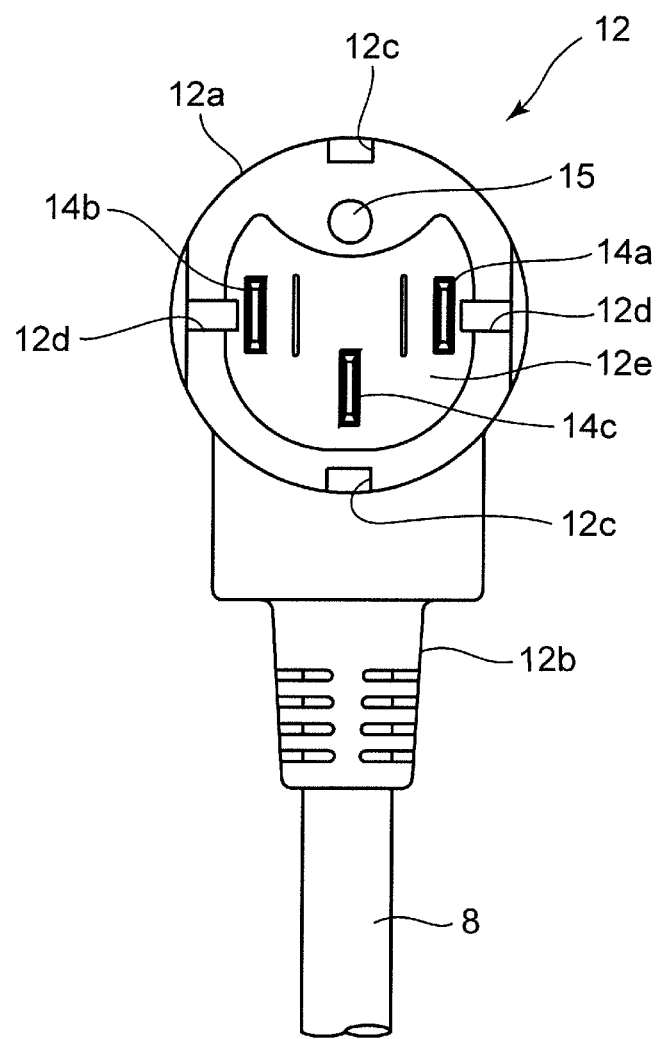
FIG. 4 is a front view showing the power plug of the power-source-side cable in the first embodiment.
Figure 5:
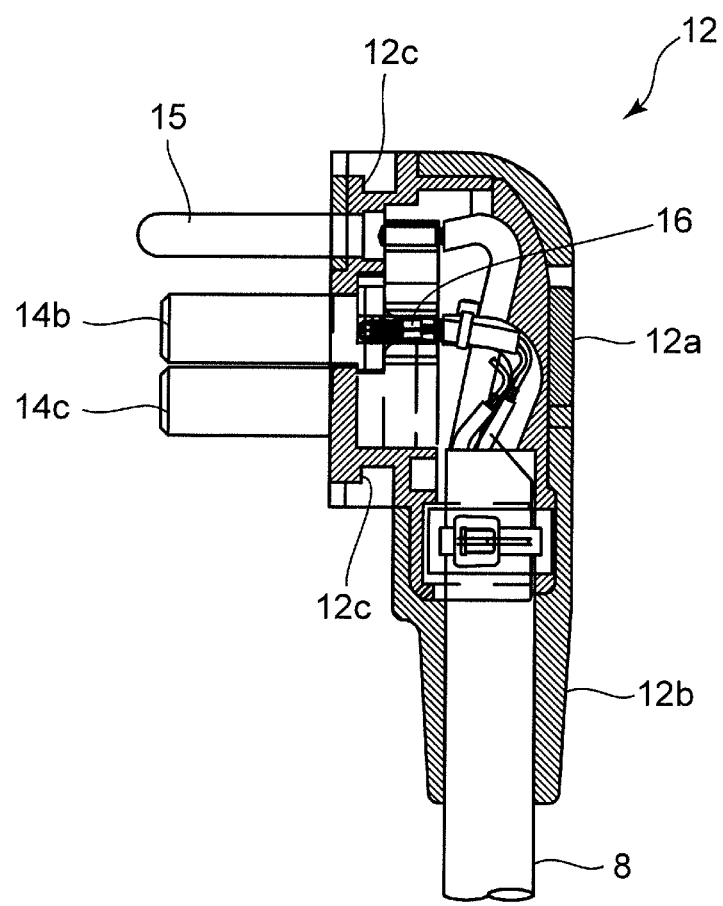
FIG. 5 is a cross-sectional view showing the power plug of the power-source-side cable in the first embodiment.

As shown in FIGS. 3 and 4, connection terminals of the power plug 12 are the three electrode plates 14 (14*a*, 14*b*, 14*c*) and the ground pin 15 for grounding projected from the contact surface 12*e*. The first electrode plate 14*a* and the second electrode plate 14*b* of the three electrode plates 14 (14*a*, 14*b*, 14*c*) of the power plug 12 are the two high-voltage electrodes used as 200 V charging electrodes. When the power plug 12 is connected to the three-phase three-wire 200 V residential power source A in use, the third electrode plate of the power plug 12, i.e., the third electrode plate 14*c*, is not used. Therefore, in the power plug 12, the third electrode plate 14*c* is not electrically connected to anywhere and is kept in a so-called electrically floating state.

As shown in FIG. 4, in the connection terminals of the power plug 12, the first electrode plate 14*a* and the second electrode plate 14*b* are flat plate-shaped lead-out portions connected to the power source and arranged such that respective flat surfaces face each other. The third electrode plate 14*c* has the same plate lead-out shape as the first electrode plate 14*a* and the second electrode plate 14*b*, has a projecting position on a center line included in the contact surface 12*e* between the first electrode plate 14*a* and the second electrode plate 14*b*, and is located at a position shifted from a facing position of the first electrode plate 14*a* and the second electrode plate 14*b* (a position offset downward in FIG. 4).

As described above, in the charging cable 1 according to the first embodiment, the first electrode plate 14*a*, the second electrode plate 14*b*, and the third electrode plate 14*c* of the power plug 12 symmetrically arranged on the contact surface 12*e* of the power plug 12 for the power outlet that is the residential power source A (200 V). The third electrode plate 14*c* is disposed on the center line that is an intermediate position between the first electrode plate 14*a* and the second electrode plate 14*b* facing each other.

The ground pin 15 is disposed on the center line and is located at a position shifted from a facing position of the first electrode plate 14*a* and the second electrode plate 14*b* (a position offset upward in FIG. 4). Therefore, the four connection terminals of the power plug 12, i.e., the first electrode plate 14*a*, the second electrode plate 14*b*, the third electrode plate 14*c*, and the ground pin 15 are arranged symmetrically with respect to the center line between the first electrode plate 14*a* and the second electrode plate 14*b*. For the electrode arrangement of the connection terminals of the power plug 12 in the first embodiment, for example, NEMA 14-50 (rated voltage: 240 V, rated current: 50 A) in the NEMA (National Electrical Manufacturers Association) standards is used. The charging cable 1 according to the first embodiment has a configuration on the assumption of US power source standards.

As described above, in the power plug 12 according to the first embodiment, the lead-out part 12*b* is disposed on the lower side of the main body part 12*a* so that the power-source-side cable 8 is lead out vertically downward from the main body part 12*a*. The ground pin 15 and the third electrode plate 14*c* are symmetrically arranged at upper and lower positions relative to the facing position of the first electrode plate 14*a* and the second electrode plate 14*b* arranged to face each other. Specifically, the ground pin 15 is disposed on the upper side relative to the facing position of the first electrode plate 14*a* and the second electrode plate 14*b*, and the third electrode plate 14*c* is disposed on the lower side relative to the facing position of the first electrode plate 14a and the second electrode plate 14b.

As shown in FIGS. 3 and 4, in the configuration of the first embodiment, position regulating grooves 12d, 12d are formed on both side surfaces of the main body part 12a of the power plug 12 (see FIGS. 3 and 4). The position regulating grooves 12d, 12d are disposed to extend in a direction orthogonal to the contact surface 12e at opposite positions on both side surfaces of the main body part 12a.

As shown in FIG. 5, the third electrode plate 14c disposed to project from the main body part 12a in a substantially horizontal direction has an electrode portion embedded in the main body part 12a and fixed to the main body part 12a and is not electrically connected to anywhere. The temperature sensor 16 (resistance temperature detector) is disposed near an electrode part in the main body part 12a for each of the first electrode plate 14a and the second electrode plate 14b. An electric signal (temperature information) from the temperature sensor 16 disposed for each of the first electrode plate 14a and the second electrode plate 14b is transmitted through the power-source-side cable 8 to the control unit 9. The control unit 9 has a configuration capable of monitoring the respective temperatures of the first electrode plate 14a and the second electrode plate 14b.

The control unit 9 includes an opening/closing circuit 28 (e.g., a relay) opening and closing a charging electric path between the power plug 12 and the charging coupler 11, and a leakage detecting part 29 monitoring a current flowing through the charging electric path to detect electric leakage (see FIG. 11 described later). When an abnormal temperature is detected from the temperature information from the temperature sensors 16, a control part 25 in the control unit 9 transmits a pilot signal to the charging control device 6 of the electric propulsion vehicle 2 to reduce a charging current. When the leakage detecting part 29 detects electric leakage, the control part 25 interrupts the charging electric path via the opening/closing circuit 28 to stop the power supply from the power source (A, B) of the charging facility to the electric propulsion vehicle 2.

[Power Adapter 13]

Figure 6:
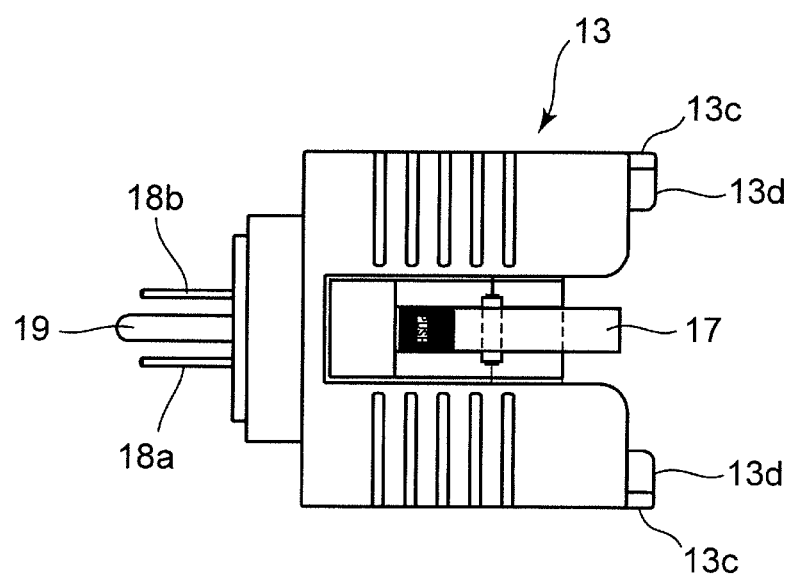
FIG. 6 is a plan view of a power adapter in the first embodiment as viewed from above.
Figure 7:
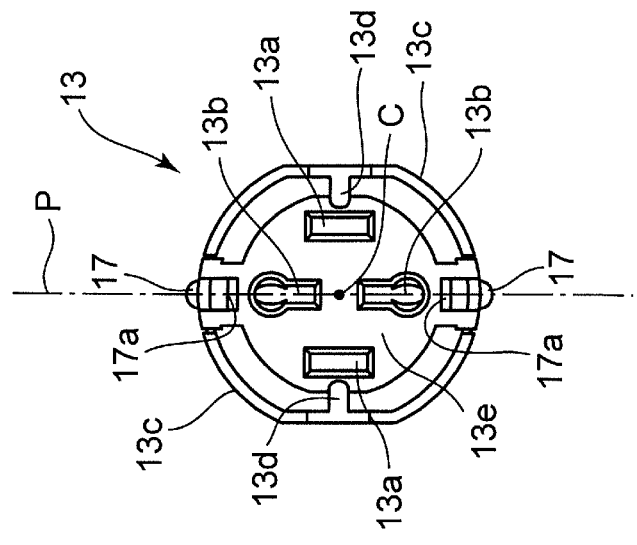
FIG. 7(a) is a front view.
FIG. 7(b) is a side view.
FIG. 7(c) is a rear view of the power adapter in the first embodiment.
Figure 7:
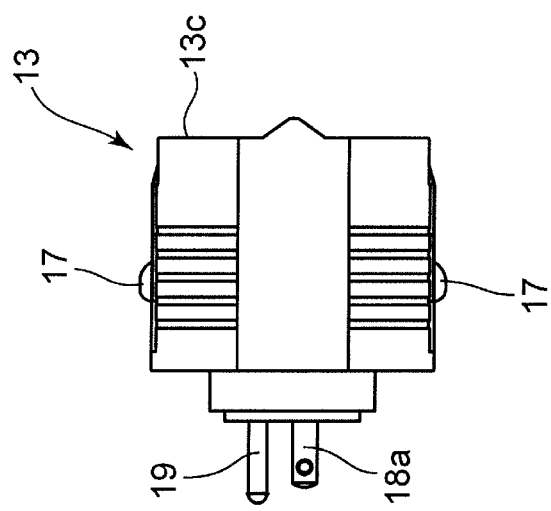
Figure 7:
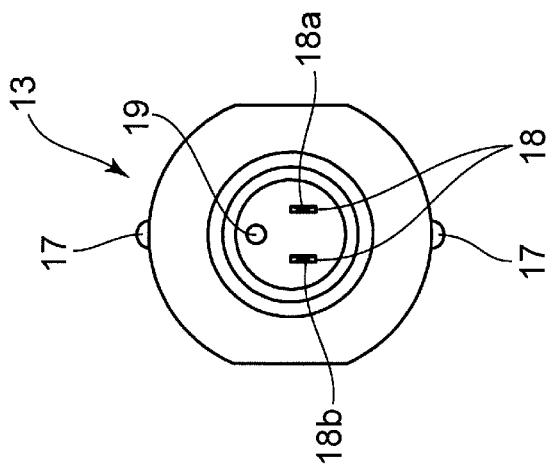

FIG. 6 is a plan view of the power adapter 13 in the first embodiment 1 as viewed from above. FIG. 7 is a front view (a), a side view (b), and a rear view (c) of the power adapter 13 in the first embodiment.

As shown in FIG. 6, the power adapter 13 has a male electrode structure projected for connection to a general residential power source (100 V) and a female electrode structure connected to the connection terminals of the power plug 12 described above. As described later, the female electrode structure of the power adapter 13 has a special electrode structure such that the power adapter 13 is easily and safely connected to the power plug 12 even in a state of being rotated by 180 degrees relative to the power plug 12.

Additionally, the power adapter 13 is provided with locking means for preventing the power plug 12 from coming off. The locking means of the power adapter 13 are made up of locking claws 17. When the power adapter 13 is properly connected to the power plug 12, the locking claws 17 of the power adapter 13 engage with locking parts 12c (see FIG. 5) that are concave portions formed on the side surfaces of the power plug 12.

As shown in FIG. 7, on one surface of the power adapter 13 (the surface on the power source side shown in (a) of FIG. 7), two electrode plates 18 serving as low-voltage electrodes connected to a 100 V power source (18a, 18b) and a ground pin 19 serving as a low-voltage ground pin are projected. The other surface of the power adapter 13 (the surface on the power plug side shown in (c) of FIG. 7) is provided with two first/second electrode holes (13a, 13a) into which the first electrode plate 14a or the second electrode plate 14b of the power plug 12 for 200 V is inserted, and two third/ground electrode holes (13b, 13b) into which the third electrode plate 14c or the ground pin 15 is inserted.

As shown in (c) of FIG. 7, the two first/second electrode holes (13a, 13a) and the two third/ground electrode holes (13b, 13b) are symmetrically arranged on a contact surface 13e of the power adapter 13 for the power plug 12. Even when rotated 180 degrees on the contact surface 13e with respect to an arrangement center C that is a center point at the same distance from the four electrode holes (13a, 13a, 13b, 13b), the four electrode holes (13a, 13a, 13b, 13b) are arranged in the same way. As shown in (c) of FIG. 7, the two third/ground electrode holes (13b, 13b) are formed at upper and lower positions relative to the arrangement center C on an arrangement center line P including the arrangement center C on the contact surface 13e. On the other hand, the two first/second electrode holes (13a, 13a) are symmetrically arranged about the arrangement center line P. Therefore, the four electrode holes (13a, 13a, 13b, 13b) of the power adapter 13 are arranged to face the three electrode plates 14 (14a, 14b, 14c) and the ground pin 15 of the power plug 12 and are arranged to allow insertion of the electrode plates 14 and the ground pin 15.

The power adapter 13 shown in FIG. 7 is provided with the locking claws 17 serving as the locking means at positions of upper and lower ends. The locking claws 17 at the upper and lower ends of the power adapter 13 are projected substantially parallel in a direction toward the power plug (rightward in (b) of FIG. 7) and have protrusions 17a with projecting tips projecting in directions facing each other. When the electrodes (14a, 14b, 14c, 15) serving as the connection terminals of the power plug 12 are inserted into the electrode holes (13a, 13b) of the power adapter 13, the protrusions 17a are engaged with the concave portions of the locking parts 12c (see FIG. 5) located at the upper and lower positions of the power plug 12, so that the power adapter 13 is reliably integrated with the power plug 12 in an attached state. In this attached state, the locking claws 17 above and below the power adapter 13 are provided with elastic members, for example, springs, so as to press the main body part 12a of the power plug 12 in a sandwiching direction, so that the power adapter 13 is not detached from the power plug 12.

When the power adapter 13 is detached from the power plug 12, convex portions disposed on the locking claws 17 are pressed to open the facing locking claws 17 in opening directions, and the protrusions 17a of the locking claws 17 are thereby released from the concave portions of the locking parts 12c of the power plug 12, so that the power adapter 13 can be detached from the power plug 12.

The charging cable 1 according to the first embodiment is configured such that when the power adapter 13 is attached to the power plug 12, the power adapter 13 can be attached even at a position rotated by 180 degrees with respect to the power plug 12. Description will hereinafter be made of the configuration in which the power adapter 13 can be mounted at a position rotated by 180 degrees with respect to the power plug 12.

Figure 8:
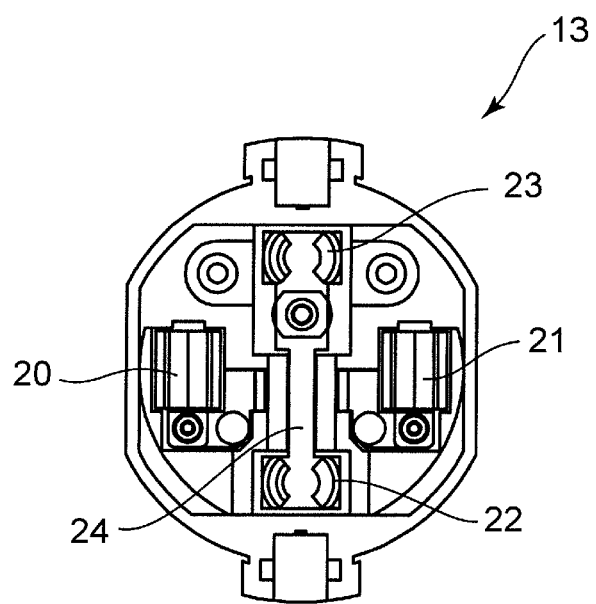
FIG. 8 is a cross-sectional view showing an electrode structure of the power adapter in the first embodiment.

FIG. 8 is a cross-sectional view showing an electrode structure of the power adapter 13 and shows an internal structure of high-voltage electrode receptacles into which the connection terminals of the power plug 12 are inserted. The cross-sectional view of FIG. 8 corresponds to the rear view shown in (c) of FIG. 7. As shown in FIG. 8, the high-voltage electrode receptacles in the power adapter 13 include a first/second electrode receptacle 20 and a second/first electrode receptacle 21 clamping the first electrode plate 14a or the second electrode plate 14b of the power plug 12 into an electrically connected state. A third/ground electrode receptacle 22 and a ground/third electrode receptacle 23 are also disposed for clamping the third electrode plate 14c or the ground pin 15 of the power plug 12 into an electrically connected state. The third/ground electrode receptacle 22 and the ground/third electrode receptacle 23 are connected to each other in the electrode structure inside the power adapter 13 and are electrically connected by a connection plate 24.

In the power adapter 13 shown in (b) of FIG. 7, the two 100V electrode plates 18 (18a, 18b) connected to a 100V power source and the ground pin 19 are projected from the surface on the left side that is the power source side. The first electrode plate 18a and the second electrode plate 18b of the power adapter 13 are electrically connected to the first/second electrode receptacle 20 and the second/first electrode receptacle 21, respectively. Specifically, in the electrode structure inside the power adapter 13, the first electrode plate 18a is electrically connected to the first/second electrode receptacle 20, and the second electrode plate 18b is electrically connected to the second/first electrode receptacle 21. In the power adapter 13, the ground pin 19 projected on the power source side (100 V side) is electrically connected to the third/ground electrode receptacle 22 and the ground/third electrode receptacle 23. Therefore, the third/ground electrode receptacle 22 and the ground/third electrode receptacle 23 in the power adapter 13 both serve as electrode receptacles on the ground side.

As shown in (c) of FIG. 7, the power adapter 13 includes the two first/second electrode holes 13a, 13a into which the first electrode plate 14a or the second electrode plate 14b of the power plug 12 is inserted, and the two third/ground electrode holes 13b, 13b into which the third electrode plate 14c or the ground pin 15 of the power plug 12 is inserted. On the contact surface 13e (the electrode-hole forming surface) of the power adapter 13 for the power plug 12, the two third/ground electrode holes 13b, 13b are disposed at upper and lower positions on the arrangement center line P in the vertical direction. The two first/second electrode holes 13a, 13a are formed on the contact surface 13e (the electrode-hole forming surface) at left and right symmetrical positions with respect to the arrangement center line P in the vertical direction.

The third/ground electrode hole 13b has a shape into which both the third electrode plate 14c and the ground pin 15 of the power plug 12 can be inserted. The first/second electrode holes 13a have the same shape since the first electrode plate 14a and the second electrode plate 14b to be inserted have the same shape. The first electrode plate 14a or the second electrode plate 14b inserted into the first/second electrode hole 13a is configured to be in an electrically reliably connected state (clamped state) with respect to the first/second electrode receptacle 20 or the second/first electrode receptacle 21 that is the high-voltage electrode receptacle inside the power adapter 13.

As described above, the first electrode plate 14a or the second electrode plate 14b of the power plug 12 is inserted into and guided by the first/second electrode hole 13a and electrically connected to the first/second electrode receptacle 20 or the second/first electrode receptacle 21. The third electrode plate 14a or the ground electrode 15 of the power plug 12 is inserted into and guided by the third/ground electrode hole 13b and electrically connected to the third/ground electrode receptacle 22 or the ground/third electrode receptacle 23.

As described above, when the power plug 12 is attached to the power adapter 13, the first electrode plate 14a or the second electrode plate 14b of the power plug 12 is electrically connected via the first/second electrode receptacle 20 or the second/first electrode receptacle 21 to the first electrode plate 18a and the second electrode plate 18b serving as low-voltage electrode plates in the power adapter 13 and is brought into a contact state allowing heat conduction. Therefore, the temperature information from the temperature sensors 16 disposed near the first electrode plate 14a and the second electrode plate 14b is temperature information allowing detection of an abnormal temperature of the charging electric path in the power adapter 13. Therefore, when an abnormal temperature in the charging electric path is detected from the temperature information from the temperature sensors 16, the control part 25 in the control unit 9 transmits a pilot signal to the charging control device 6 of the electric propulsion vehicle 2 to reduce a charging current so that the power supply from the power source of the charging facility to the electric propulsion vehicle 2 can be reduced in this configuration.

As shown in (C) of FIG. 7, the power adapter 13 has an annular skirt part 13c formed to surround a tip portion on the contact side of the main body part 12a of the power plug 12 to be connected. On the inner surface side of the skirt part 13c, two position regulating protrusions 13d, 13d projecting in opposite directions are formed.

[Connection Between Power Plug 12 and Power Adapter 13]

Figure 9A:
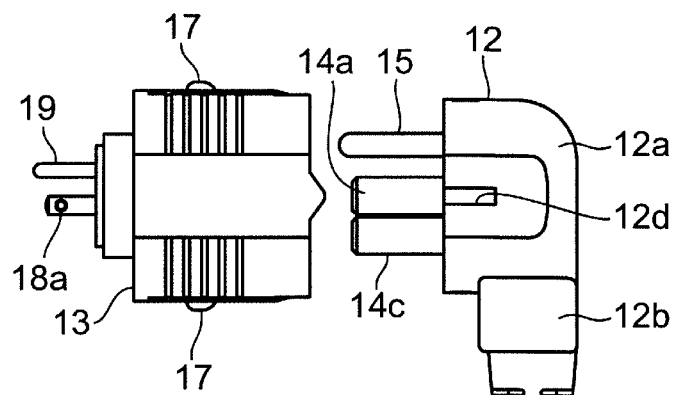
FIG. 9(a), FIG. 9(b), and FIG. 9(c) show a connection process between the power plug and the power adapter in the first embodiment.
Figure 9B:
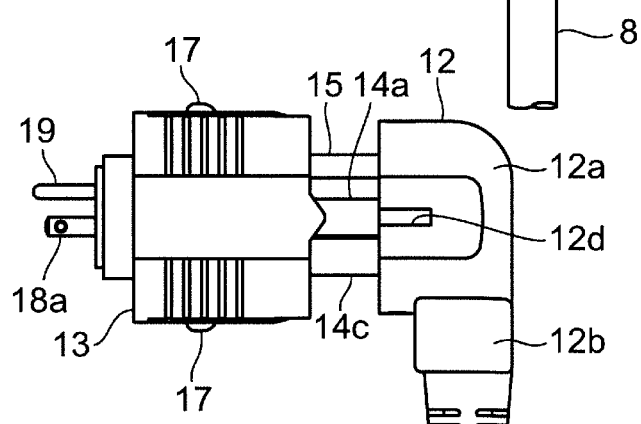
Figure 9C:
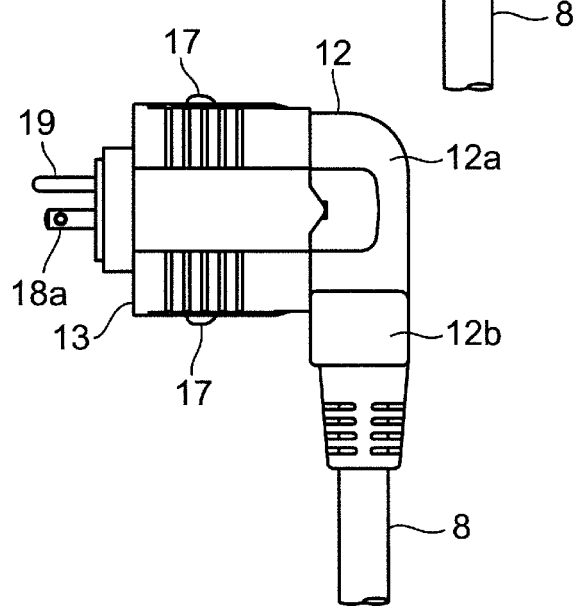
Figure 10:
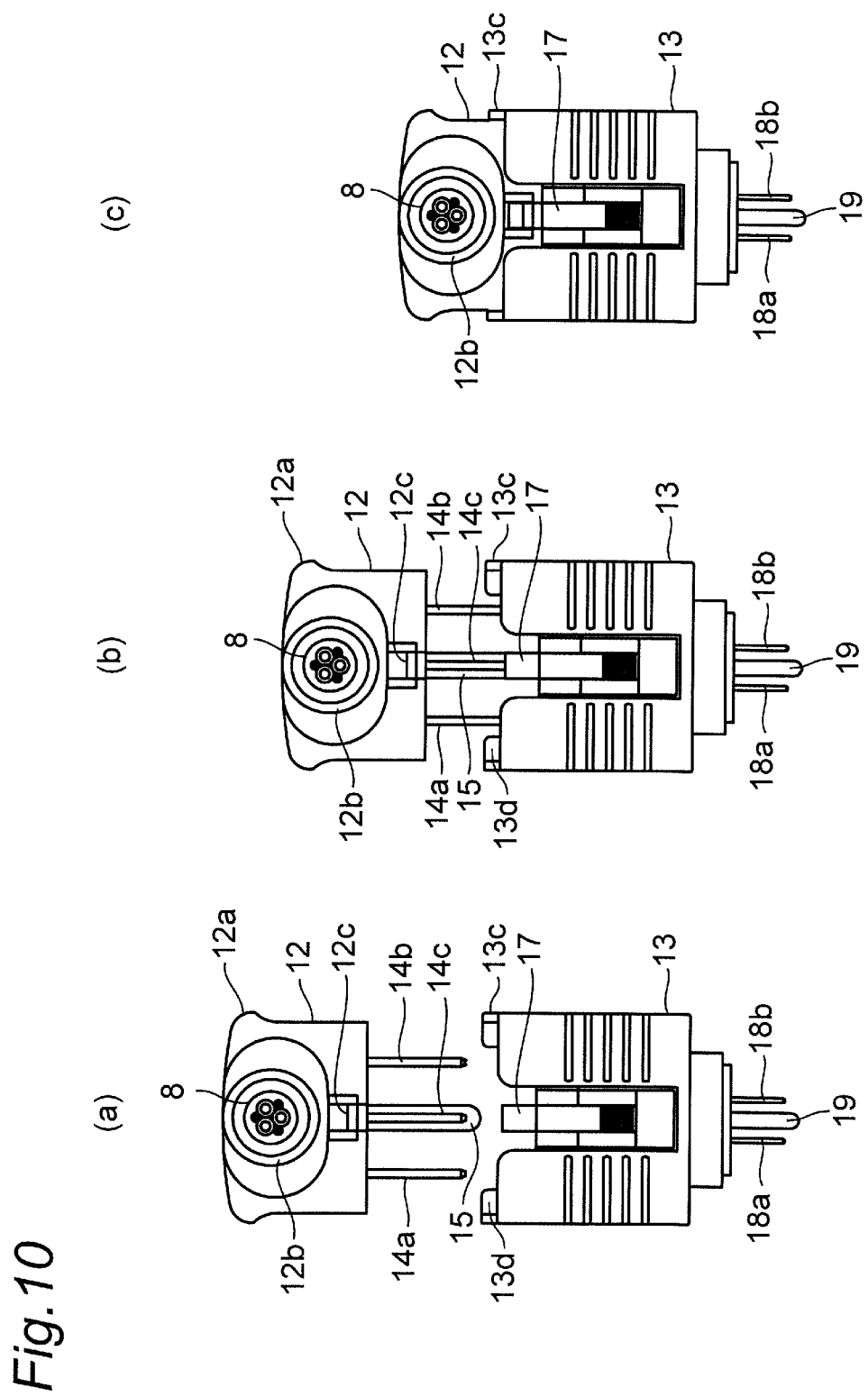
FIG. 10 is a diagram showing the connection process between the power plug and the power adapter in the first embodiment.

FIGS. 9 and 10 are diagrams for explaining a connection state between the power plug 12 and the power adapter 13. In FIG. 9, (a) shows a state immediately before the connection between the power plug 12 and the power adapter 13, (b) shows a state in which tip portions of the high-voltage electrode plates 14 (14a, 14b, 14c) and the ground pin 15 of the power plug 12 are inserted halfway into the electrode holes (13a, 13b) of the power adapter 13, and (c) shows a state when the power adapter 13 is completely connected (attached) to the power plug 12. In FIG. 10, (a) corresponds to the state immediately before the connection of (a) of FIG. 9, (b) corresponds to the half-inserted state of (b) of FIG. 9, and (c) corresponds to the completely connected state of (c) of FIG. 9. FIG. 9 is a diagram showing right side surfaces of the power plug 12 and the power adapter 13, and FIG. 10 is a rear view of the power plug 12 and the power adapter 13 as viewed from below.

In the configuration of the first embodiment, the position regulating grooves 12d are formed on both side surfaces of the main body part 12a of the power plug 12, so that the position regulating protrusions 13d formed on the power adapter 13 (see (c) of FIG. 7) are fit into the position regulating grooves 12d. The position regulating grooves 12d are disposed at positions opposite to each other on both side surfaces of the main body part 12a (opposite positions rotated 180 degrees from each other). The power adapter 13 has the annular skirt part 13c formed to surround the tip portion on the contact side of the main body part 12a of the power plug 12 to be connected, and the position regulating protrusions 13d are formed at positions opposite to each other inside the skirt part 13c. These position restricting protrusions 13d are configured to respectively engage with the position restricting grooves 12d formed on both side surfaces of the main body part 12a of the power plug 12 when the power adapter 13 is attached (connected) to the power plug 12. Therefore, in the configuration of the first embodiment, the power adapter 13 can be connected to the power plug 12 only at two positions rotated 180 degrees from each other at which the position regulating protrusions 13d can engage with the position regulating grooves 12d.

As described above, in the charging cable 1 according to the first embodiment, for example, NEMA 14-50 (rated voltage: 240 V, rated current: 50 A) in the NEMA (National Electrical Manufacturers Association) standards is used for the electrode arrangement of the connection terminals of the power plug 12. Therefore, for example, the three electrode plates (14a, 14b, 14c) and the ground pin 15 are inserted in a residential power source assumed to be the residential charging facility. In such a residential power source (100 V/200 V) having a ground pin, a ground pin insertion port may be disposed on the upper side or lower side relative to an electrode insertion port. When the power plug 12 of the first embodiment is attached to the indoor power source A (200 V) for charging, and the ground pin insertion port is on the upper side relative to the electrode insertion port, the power plug 12 can be attached such that the ground pin 15 is located on the upper side (the state shown in FIG. 3). In this case, the power-source-side cable 8 from the lead-out part 12b of the power plug 12 is arranged to be led out vertically downward.

On the other hand, when the ground pin insertion port is on the lower side relative to the electrode insertion port, the power-source-side cable 8 is led out upward from the power plug 12, so that a force is applied to the power plug 12 in the direction causing disconnection from the residential power source A due to the weight of the power-source-side cable 8 etc. The power plug 12 is attached to the residential power source A (200 V) at four positions, i.e., the three electrode plates (14a, 14b, 14c) and the ground pin 15. Furthermore, since the electrode plates and the ground pin are for high voltage and high current and therefore have a sufficient size, the power plug 12 is not disconnected even when such a force is applied in the direction causing disconnection from the residential power source A.

Description will be made of the case that the power plug 12 of the first embodiment with the power adapter 13 attached thereto is attached to the residential power source B (100 V) for charging. When the ground pin insertion port is on the upper side relative to the electrode insertion port, the power plug 12 can be attached to the power adapter 13 such that the ground pin 15 is located on the upper side (the state shown in (c) of FIG. 9). Therefore, the power-source-side cable 8 from the lead-out part 12b of the power plug 12 is arranged to be led out vertically downward.

On the other hand, when the ground pin insertion port is on the lower side relative to the electrode insertion port, the power-source-side cable 8 is led out upward from the power plug 12 in the state shown in (c) of FIG. 9. Therefore, an unnecessary load is applied to the power adapter 13 integrated with the power plug 12 and the power source into which the power adapter 13 is inserted. The power adapter 13 is attached to the residential power source B (100 V) at three positions, i.e., the two electrode plates (18a, 18b) and the ground pin 19. Furthermore, the two electrode plates (18a, 18b) and the ground pin 19 are for low voltage and low current and therefore are considerably smaller than the electrode plates (14a, 14b, 14c) and the ground pin 15 of the power plug 12. If the power-source-side cable 8 is led out upward from the power plug 12 and a force is applied to the power adapter 13 in the direction causing disconnection from the power source, the power adapter 13 may be disconnected from the power source (B).

However, the charging cable 1 of the first embodiment allows the power plug 12 to be attached to the power adapter 13 at the opposite position rotated by 180 degrees. Even when the ground pin insertion port is on the lower side relative to the electrode insertion port, the power-source-side cable 8 from the lead-out part 12b of the power plug 12 can be arranged to be led out vertically downward. This can prevent an accident such as a disconnection of the power adapter 13 integrated with the power plug 12 from the power source (B).

As described above, in the configuration of the power adapter 13 of the first embodiment, the high-voltage electrode holes (the third/ground electrode holes 13b) are shared holes into which the third electrode plate 14c and the ground pin 15 of the power plug 12 are inserted. In the configuration of the power adapter 13, the third electrode plate 14c and the ground pin 15 of the power plug 12 are electrically connected to the third/ground electrode receptacle 22 and the ground/third electrode receptacle 23 that are in an electrically connected state. Therefore, the ground pin 15 of the power plug 12 is electrically reliably connected to the ground pin 19 of the power adapter 13 regardless of the positions (positions rotated by 180 degrees from each other) of the power plug 12 attached to the power adapter 13.

Therefore, when the charging cable 1 according to the first embodiment is used for charging, the power plug 12 can be attached (connected) to the power adapter 13 such that the lead-out part 12b is always led out vertically downward.

As described above, in the charging cable 1 according to the first embodiment, the power plug 12 and the power adapter 13 have the ground pins (15, 19) as the connection terminals, and the ground pins (15, 19) are located on the upper side or the lower side relative to the connection terminals serving as the charging terminals and have a projection length set longer than the connection terminals of the charging terminals. Therefore, while the charging cable 1 of the first embodiment is connected to the power source (B), the power adapter 13 integrated with the power plug 12 is prevented from falling off from the power source (B).

Figure 11:
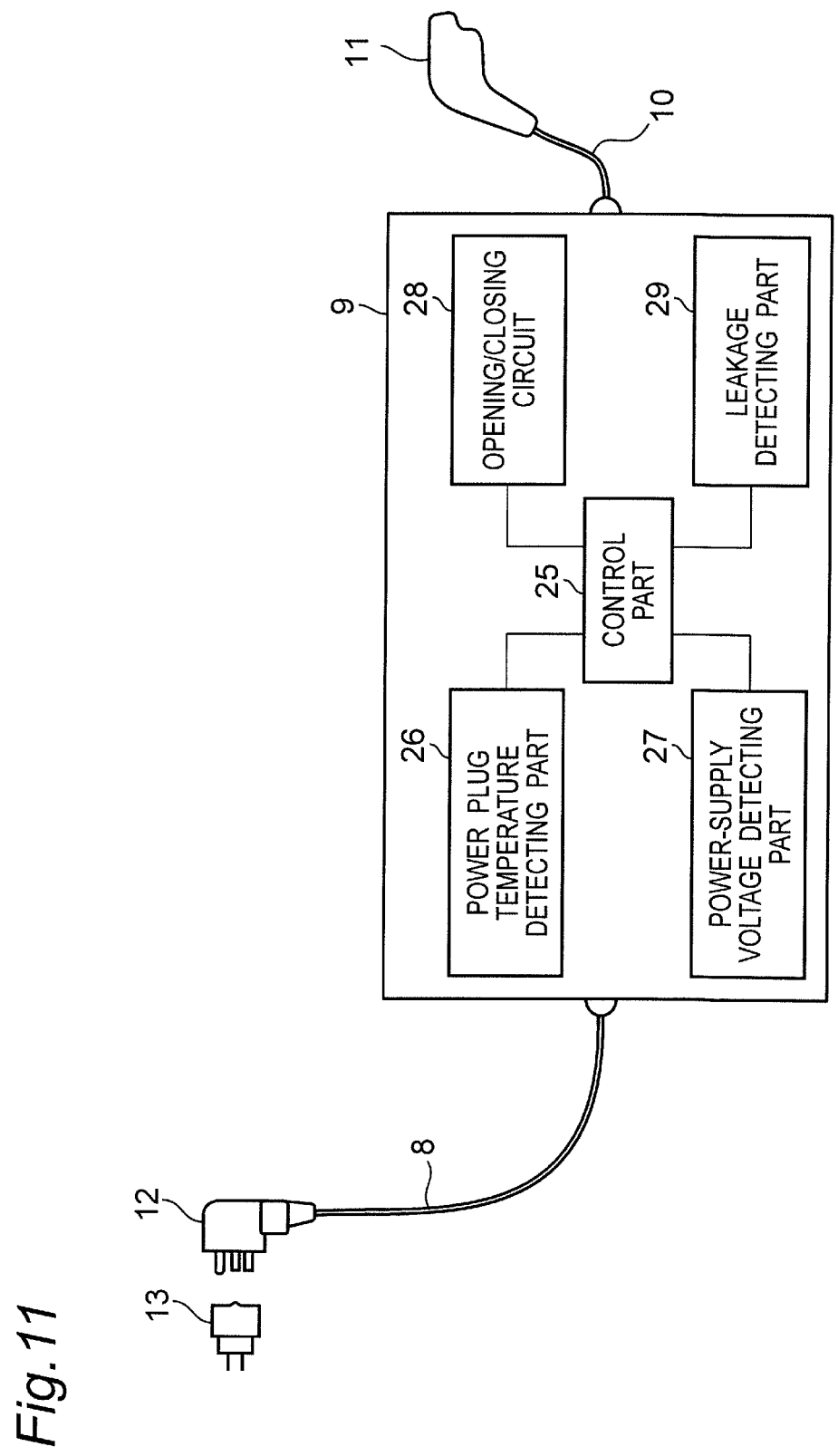
FIG. 11 is a block diagram showing a main configuration of the charging cable in the first embodiment.

FIG. 11 is a block diagram showing a main configuration of the charging cable 1 of the first embodiment. As shown in FIG. 11, the control unit 9 of the charging cable 1 includes the control part 25 made up of a microcomputer, a power plug temperature detecting part 26 receiving a signal (temperature information) from the temperature sensors 16 disposed on the power plug 12, a power-supply voltage detecting part 27 detecting power-supply voltage information supplied by the power plug 12, the opening/closing circuit 28 (e.g., a relay) opening and closing a charging electric path between the power plug 12 and the charging coupler 11, and the leakage detecting part 29 monitoring a current flowing through the charging electric path to detect electric leakage.

In the control part 25, the temperature information is input from the power plug temperature detecting part 26, and a charging operation is controlled based on the detected temperature information. When the leakage detecting part 29 detects electric leakage, the control part 25 interrupts the charging electric path via the opening/closing circuit 28 to stop the power supply from the power source to the electric propulsion vehicle 2.

In the charging cable 1 of the first embodiment, the information of temperature at the power plug 12, the information of the power-supply voltage supplied by the power plug 12, etc. are detected by the control part 25 of the control unit 9, and the control part 15 generates a pilot signal based on the detected information. The control part 15 is configured to transmit the generated pilot signal to the electric propulsion vehicle 2 connected via the vehicle-side cable 10. The control part 25 changes, for example, a duty ratio of the pilot signal in accordance with the power-supply voltage information so as to transmit to the electric propulsion vehicle 2 the charging information such as a charging current to be supplied from the power source.

As described above, the configuration of the charging cable 1 of the first embodiment can provide the charging cable 1 and the power adapter used with the charging cable 1 compatible with power sources (100 V/200 V) in charging facilities of different standards. As described above, in the configuration of the charging cable 1 of the first embodiment according to the present disclosure, the power adapter 13 has no mechanism for converting the voltage, the electric power supplied from the power source is transmitted via the charging cable 1 to the electric propulsion vehicle 2, and an appropriate charging operation is performed based on the electric power supplied to the electric propulsion vehicle 2 and the charging information.

In the description of the configuration of the first embodiment, the charging operation is controlled based on the temperature information of the power plug 12 and the power adapter 13 by using the temperature sensor 16 as the temperature detecting means for the power plug 12; however, the present invention is not limited to this configuration. For example, in the present invention, the temperature detecting means may be used for main constituent elements such as a connection portion of the power-source-side cable 8 with the control unit 9, the charging coupler 11 of the vehicle-side cable 10, and/or the control unit 9 that is a main body, so as to control the charging operation based on pieces of the temperature information of the respective constituent elements.

Abnormal heat generated in use of the charging cable 1 occurs due to an incomplete contact or a tracking phenomenon in a connection portion between the power source (power outlet) of the charging facility and the power plug 12, a connection portion between the charging coupler 11 and the connector 7 of the electric propulsion vehicle 2, and a connection portion between connection terminals of a power line through which a charging current flows in the control unit 9 that is the main body. Therefore, the temperature detecting means (the temperature sensors 16) are preferably disposed near the respective connection portions in the charging electric path where abnormal heat generation occurs.

As described above, in the electric propulsion vehicle 2, the charging current to the battery 5 is controlled based on the pilot signal transmitted from the control part 25 in the control unit 9 of the charging cable 1. According to the configuration of the first embodiment, when the temperature detecting means detect abnormal heat generation, the charging current can variably be set on the electric propulsion vehicle side according to the temperature detected by the temperature detecting means. Therefore, for example, when the temperature of the power plug 12 increases, the charging current can be reduced to continue the charging of the battery 5 without interruption such that a temperature rise of the power plug 12 is suppressed. This can result in not only a reduction in the charging time, but also an improvement in durability of a relay etc.

Alternatively, by disposing first temperature detecting means in the power plug 12 and/or the charging coupler 11 and disposing second temperature detecting means in the control unit 9, the control part 25 can determine defect of the power plug 12, the power adapter 13, and/or the charging coupler 11 based on the output of the two first/second temperature detecting means, and this configuration leads to an improvement in reliability of the equipment.

More specifically, when the temperature detected by the temperature detecting means reaches a preset threshold value, the control part 25 of the control unit 9 can transmit a pilot signal having a changed waveform to the electric propulsion vehicle 2 to give notification to the electric propulsion vehicle 2 for reducing the charging current so as to prevent overheat of the power plug 12, which enables a further improvement in safety.

Alternatively, when the temperature detected by the temperature detecting means reaches the threshold value, the control part 25 of the control unit 9 can transmit a pilot signal having a changed pulse width to the electric propulsion vehicle 2 to give notification to the electric propulsion vehicle 2 for reducing the charging current in a stepless manner so as to achieve the same effect.

Alternatively, when the temperature detected by the temperature detecting means reaches the threshold value, the control part 25 of the control unit 9 may use a pilot signal to give notification to the electric propulsion vehicle 2 for reducing the charging current in a stepwise manner.

Alternatively, when the temperature detected by the temperature detecting means reaches the threshold value, the control part 25 of the control unit 9 may transmit a pilot signal having a changed amplitude to the electric propulsion vehicle to give notification to the electric propulsion vehicle 2 for reducing the charging current.

Alternatively, the control part 25 of the control unit 9 may perform calculation with the temperature detected by the temperature detecting means and transmit to the electric propulsion vehicle 2 a pilot signal having an amplitude gradually changed in advance so as to prevent the temperature from reaching the threshold value, thereby giving notification to the electric propulsion vehicle 2 for reducing the charging current.

Furthermore, in addition to the control methods described above, a method may be adopted such that the charging electric circuit is finally interrupted when the temperature detected by the temperature detecting means reaches the threshold value.

It is noted that any of the configurations described in the embodiments can appropriately be combined to produce the excellent effects of the respective configurations.

Although the present disclosure has been sufficiently described in terms of preferable embodiments with reference to the accompanying drawings, various modifications and corrections are apparent to those skilled in the art. It should be understood that such modifications and corrections are included in the present disclosure without departing from the scope of the present disclosure according to the accompanying claims.

INDUSTRIAL APPLICABILITY

The charging cable according to the present disclosure has a simple configuration easily compatible with power sources in charging facilities of different standards and is useful as a charging cable for an electric propulsion vehicle at least equipped with a battery for running.

The invention claimed is:

1. An electric propulsion vehicle charging cable having one end provided with a power plug connected to a power source of a charging facility and the other end provided with a charging coupler detachably connected via a controller to an electric propulsion vehicle, wherein the power plug has an electrode structure including three high-voltage electrodes and a high-voltage ground pin, the electric propulsion vehicle charging cable used for charging a battery of the electric propulsion vehicle by using two of the three high-voltage electrodes, wherein the electric propulsion vehicle charging cable has a power adapter including electrode receptacles to which the three high-voltage electrodes and the high-voltage ground pin are connected and connection terminals having an electrode structure corresponding to a power source of a different standard from the electrode structure of the power plug, wherein the connection terminals of the power adapter have an electrode structure including two low-voltage electrodes and a low-voltage ground pin of a different standard from the electrode structure of the power plug, and wherein in the power adapter, the electrode receptacle to be connected to one high-voltage electrode not used as a charging electrode among the three high-voltage electrodes of the power plug and the electrode receptacle to be connected to the high-voltage ground pin are electrically connected to each other.

2. The electric propulsion vehicle charging cable according to claim 1, wherein the two low-voltage electrodes are respectively electrically connected to two electrode receptacles respectively connected to the two high-voltage electrodes used as charging electrodes among the three high-voltage electrodes of the power plug.

3. The electric propulsion vehicle charging cable according to claim 2, wherein the power adapter includes four electrode holes into which the three high-voltage electrodes and the high-voltage ground pin of the power plug are inserted and led to respective electrode receptacles, wherein the four electrode holes are symmetrically arranged on a contact surface for the power plug, and wherein among the four electrode holes, the electrode hole leading to the electrode receptacle to be connected to the one high-voltage electrode not used as the charging electrode has substantially the same shape as the electrode hole leading to the electrode receptacle to be connected to the high-voltage ground pin.

4. The electric propulsion vehicle charging cable according to claim 3, wherein the power adapter is configured to be attached to the power plug at positions rotated by 180 degrees from each other with respect to a center of arrangement of the four electrode holes on the contact surface for the power plug.

5. The electric propulsion vehicle charging cable according to claim 3, wherein in the power adapter, the electrode hole leading to the electrode receptacle to be connected to the one high-voltage electrode not used as the charging electrode and the electrode hole leading to the electrode receptacle to be connected to the high-voltage ground pin are arranged on an arrangement center line included on the contact surface, and wherein the two electrode holes leading to the electrode receptacles respectively connected to the two high-voltage electrodes used as the charging electrodes are symmetrically arranged on both sides of the arrangement center line.

6. The electric propulsion vehicle charging cable according to claim 1, wherein the power adapter includes a lock engaging with the attached power plug.

7. The electric propulsion vehicle charging cable according claim 2, wherein the power adapter includes a lock engaging with the attached power plug.

8. The electric propulsion vehicle charging cable according to claim 3, wherein the power adapter includes a lock engaging with the attached power plug.

9. The electric propulsion vehicle charging cable according to claim 4, wherein the power adapter includes a lock engaging with the attached power plug.

10. The electric propulsion vehicle charging cable according to claim 5, wherein the power adapter includes a lock engaging with the attached power plug.

11. A power adapter attached to an electric propulsion vehicle charging cable having one end provided with a power plug connected to a power source of a charging facility and the other end provided with a charging coupler detachably connected via a controller to an electric propulsion vehicle, wherein the power plug has an electrode structure including three high-voltage electrodes and a high-voltage ground pin, the electric propulsion vehicle charging cable used for charging a battery of the electric propulsion vehicle by using two of the three high-voltage electrodes, wherein the power adapter includes electrode receptacles to which the three high-voltage electrodes and the high-voltage ground pin are connected and connection terminals having an electrode structure corresponding to a power source of a different standard from the electrode structure of the power plug, wherein the connection terminals of the power adapter have an electrode structure including two low-voltage electrodes and a low-voltage ground pin of a different standard from the electrode structure of the power plug, and wherein the electrode receptacle to be connected to one high-voltage electrode not used as a charging electrode among the three high-voltage electrodes of the power plug and the electrode receptacle to be connected to the high-voltage ground pin are electrically connected to each other.

12. The power adaptor according to claim 11, wherein the two low-voltage electrodes are respectively electrically connected to two electrode receptacles respectively connected to the two high-voltage electrodes used as charging electrodes among the three high-voltage electrodes of the power plug.

13. The power adaptor according to claim 12, wherein the power adapter includes four electrode holes into which the three high-voltage electrodes and the high-voltage ground pin of the power plug are inserted and led to respective electrode receptacles, wherein the four electrode holes are symmetrically arranged on a contact surface for the power plug, and wherein among the four electrode holes, the electrode hole leading to the electrode receptacle to be connected to the one high-voltage electrode not used as the charging electrode has substantially the same shape as the electrode hole leading to the electrode receptacle to be connected to the high-voltage ground pin.

14. The power adaptor according to claim 13,
wherein the power adapter is configured to be attached to the power plug at positions rotated by 180 degrees from each other with respect to a center of arrangement of the four electrode holes on the contact surface for the power plug.

15. The power adaptor according to claim 14,
wherein the electrode hole leading to the electrode receptacle to be connected to the one high-voltage electrode not used as the charging electrode and the electrode hole leading to the electrode receptacle to be connected to the high-voltage ground pin are arranged on an arrangement center line included on the contact surface, and
wherein the two electrode holes leading to the electrode receptacles respectively connected to the two high-voltage electrodes used as the charging electrodes are symmetrically arranged on both sides of the arrangement center line.

16. The power adaptor according to claim 11,
wherein the power adapter includes a lock engaging with the attached power plug.

17. The power adaptor according to claim 12,
wherein the power adapter includes a lock engaging with the attached power plug.

18. The power adaptor according to claim 13,
wherein the power adapter includes a lock engaging with the attached power plug.

19. The power adaptor according to claim 14,
wherein the power adapter includes a lock engaging with the attached power plug.

20. The power adaptor according to claim 15,
wherein the power adapter includes a lock engaging with the attached power plug.

* * * * *